UNITED STATES PATENT OFFICE.

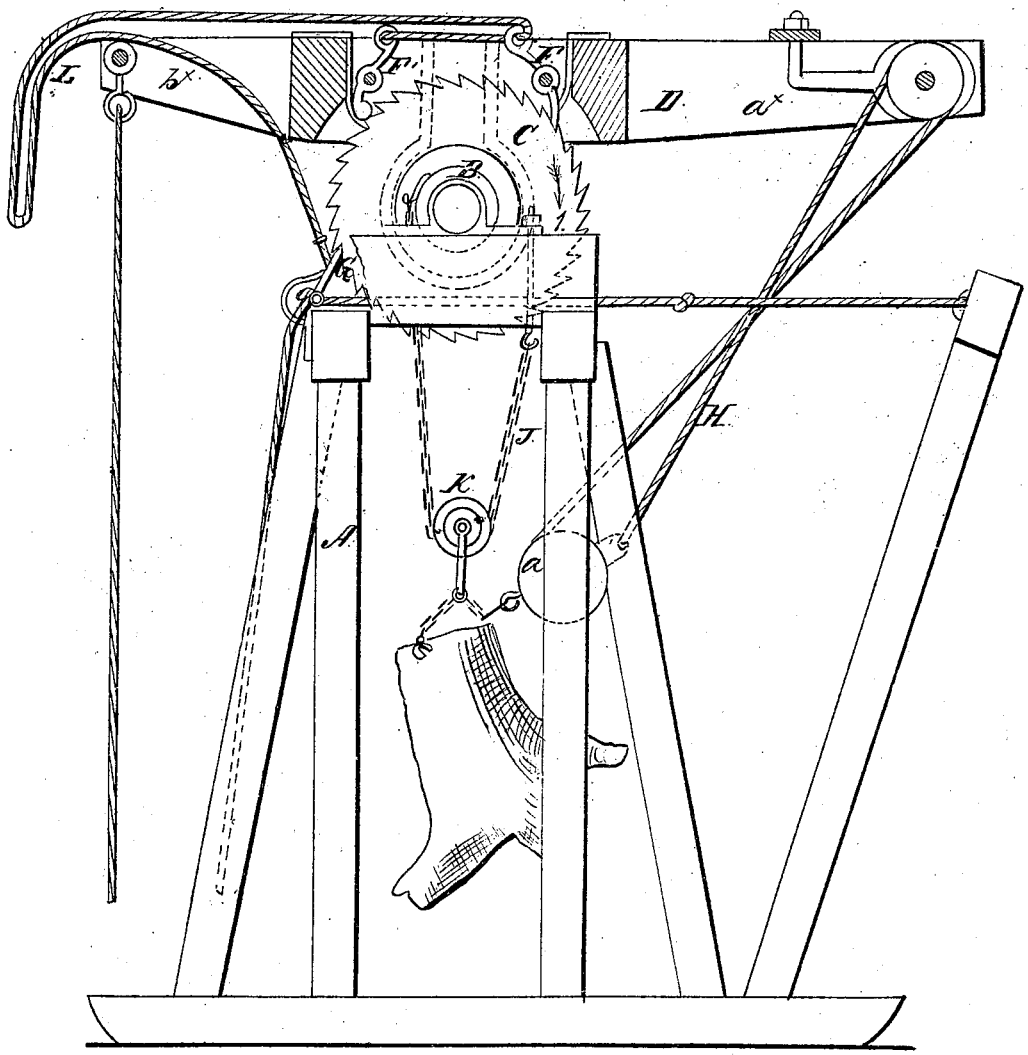

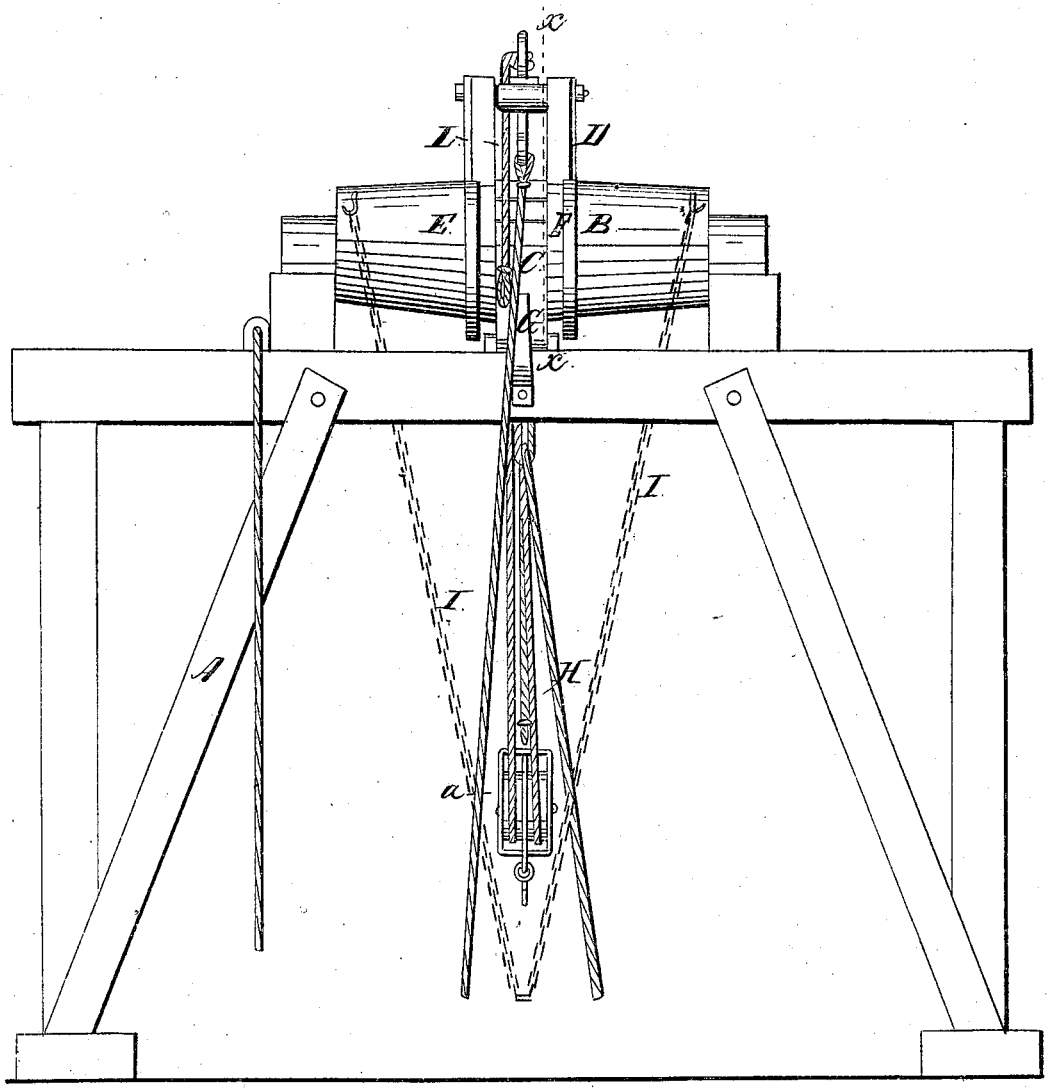

NATHAN PARRISH, OF KALAMAZOO, MICHIGAN.

IMPROVEMENT IN STUMP-EXTRACTORS.

Specification forming part of Letters Patent No. 54,398, dated May 1, 1866.

*To all whom it may concern:*

Be it known that I, NATHAN PARRISH, of Kalamazoo, in the county of Kalamazoo and State of Michigan, have invented a new and Improved Stump-Extractor; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, an end view of the same.

Similar letters of reference indicate corresponding parts.

This invention relates to a new and improved machine for extracting stumps; and it consists in the employment of a lever connected with a windlass and used in connection with a tackle, all arranged as hereinafter fully shown and described, whereby stumps may be extracted with the greatest facility, a good leverage power being obtained with a very compact arrangement of parts.

A represents a framing, which may be constructed in any proper manner to support the working parts, and B is a windlass-shaft, which is placed horizontally on the framing A, and is of biconical form, said shaft decreasing in diameter from its center toward both ends, as shown clearly in Fig. 2. On the center of the shaft B there is firmly keyed a ratchet-wheel C, and D is a lever which has two circular bars, E, attached to it to fit upon the shaft B, one at each side of the ratchet, said bars being allowed to turn freely on the shaft B, and serving as supports for lever D.

F F' are two pawls attached to or fitted within the lever D, F being a pushing, and F' a pulling, pawl, as shown in Fig. 1. These pawls engage with the ratchet C and serve to turn, as the lever D is operated, the ratchet C and the shaft B in the direction indicated by arrow 1, the ratchet being prevented from turning in a contrary direction by a holding-pawl, G.

To one end of the lever D there is attached a tackle, H, the lower block, $a$, of which is connected to the stump to be extracted, as shown in red in Fig. 1, and to the outer and smaller ends of the shaft B the ends of a chain, I, are attached. (See Fig. 2.) This chain I may be secured directly to the stump, or, where great power is required, chains J may be used, one end being attached to the framing A and passing around a pulley, K, and the opposite ends attached to the outer ends of the shaft B.

By this arrangement it will be seen that by drawing down the arm $a^\times$ of the lever D, through the medium of the tackle H, which is attached to said arm, the ratchet C will be turned, and consequently the shaft B and the chains I or J wound upon said shaft and the stump raised.

If another pull is necessary, the opposite arm, $b^\times$, of the lever D is pulled down through the medium of a rope, $c$, the holding-pawl G preventing the turning of the ratchet C, and the arm $a^\times$ is again drawn down through the medium of the tackle H.

When a stump is extracted and the chains I or J detached from it the pawls F, F', and G are drawn out from the ratchet by pulling a cord or rope, L', which is attached to them, and the shaft B is thereby allowed to turn freely in a backward direction, so that the chains may be unwound from it.

By this device it is believed that a good leverage power is obtained with a very compact arrangement of parts, and the invention possesses the advantage of having a gradually-increasing speed, for it will be seen that during the first movement of the shaft B the chain or chains wind upon the small ends of said shaft, and consequently the most power is exerted during the commencement of the operation, the power decreasing and the speed proportionably increasing as the chains wind upon the gradually-increasing diameter of the shaft B.

L is a movable bent, consisting of two uprights joined together at the top at right angles with a cross-bar, having their points of support and vibration in the base of the frame A.

$l\ l$ are hooks inserted in the cross-bar of the bent, and affording means of attachment for the rope $c$ when it is drawn to such a position that when power is applied to the tackle and the lever D is depressed the end $a$ will rest upon and be supported by the bent independently of the shaft B.

Having thus described my invention, what I claim as new, and desire to secure by Letters Patent, is—

1. The arrangement of the lever D, circular bars E, ratchet C, shaft B, pawls F F', and tackle H, relatively to each other and operating in the manner as described.

2. The movable bent L, in combination with the lever D, arranged and operating independently of the shaft B, in the manner and for the purpose herein described.

NATHAN PARRISH.

Witnesses:
A. A. KNOPPEN,
R. F. JOHNSTONE.